United States Patent
Rudden et al.

(10) Patent No.: US 11,429,908 B2
(45) Date of Patent: Aug. 30, 2022

(54) IDENTIFYING RELATED MESSAGES IN A NATURAL LANGUAGE INTERACTION

(71) Applicant: International Business Machines Corporation, Armonk, NY (US)

(72) Inventors: Mary Rudden, Denver, CO (US); Craig M. Trim, Ventura, CA (US); Martin G. Keen, Cary, NC (US); John M. Ganci, Jr., Raleigh, NC (US); Hernan A. Cunico, Holly Springs, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 125 days.

(21) Appl. No.: 16/863,786

(22) Filed: Apr. 30, 2020

(65) Prior Publication Data

US 2021/0342963 A1 Nov. 4, 2021

(51) Int. Cl.
*G06Q 10/00* (2012.01)
*G06Q 10/06* (2012.01)
(Continued)

(52) U.S. Cl.
CPC ..... *G06Q 10/063118* (2013.01); *G06F 40/40* (2020.01); *G06N 3/04* (2013.01);
(Continued)

(58) Field of Classification Search
None
See application file for complete search history.

(56) References Cited

U.S. PATENT DOCUMENTS 8,983,940 B2   3/2015 Lin et al.
9,141,924 B2 *  9/2015 Friedlander .... G06Q 10/063112
(Continued)

FOREIGN PATENT DOCUMENTS

CN   102968701 A   3/2013
CN   105590175 A   5/2016
(Continued)

OTHER PUBLICATIONS

Jantan, Hamidah, Abdul Razak Hamdan, and Zulaiha Ali Othman. "Knowledge discovery techniques for talent forecasting in human resource application." World Academy of Science, Engineering and Technology 50 (2009): 775-783. (Year: 2009).*
(Continued)

*Primary Examiner* — Gurkanwaljit Singh
(74) *Attorney, Agent, or Firm* — Garg Law Firm, PLLC; Rakesh Garg; Michael O'Keefe

(57) ABSTRACT

By executing a natural language processing model on a set of natural language text describing a first engagement, a set of characteristics of the first engagement is generated. By executing the natural language processing model on a set of natural language text describing a future engagement, a set of characteristics of the future engagement is generated. The first engagement is determined to be above a threshold similarity with the future engagement. Using the skillset used in performing the first engagement, a required skillset of the future engagement is forecasted. By executing the natural language processing model on a set of natural language text describing a current skillset, a set of characteristics of the current skillset is generated. Using the required skillset of the future engagement and the set of characteristics of the current skillset, a learning path is generated.

20 Claims, 14 Drawing Sheets

(51) Int. Cl.
*G06Q 50/20* (2012.01)
*G06Q 10/04* (2012.01)
*G06N 3/04* (2006.01)
*G06F 40/40* (2020.01)
*G09B 19/00* (2006.01)

(52) U.S. Cl.
CPC ......... *G06Q 10/04* (2013.01); *G06Q 10/0639* (2013.01); *G06Q 10/063112* (2013.01); *G06Q 50/2057* (2013.01); *G09B 19/003* (2013.01); *G09B 19/0053* (2013.01)

(56) References Cited

U.S. PATENT DOCUMENTS

| | | | |
|---|---|---|---|
| 9,489,428 | B2 | 11/2016 | Wang et al. |
| 11,017,339 | B2* | 5/2021 | Rocco ............ G06Q 10/063112 |
| 2003/0088562 | A1* | 5/2003 | Dillon .................... G06F 16/951 707/999.005 |
| 2008/0167929 | A1* | 7/2008 | Cao ........................ G06Q 10/06 705/7.11 |
| 2008/0208646 | A1* | 8/2008 | Thompson ............. G06Q 10/10 705/7.42 |
| 2009/0276231 | A1 | 11/2009 | Bazigos et al. |
| 2009/0319344 | A1* | 12/2009 | Tepper ................... G06Q 10/10 705/7.39 |
| 2010/0169323 | A1 | 7/2010 | Liu et al. |
| 2011/0054973 | A1* | 3/2011 | Deich ................ G06Q 30/0202 705/7.31 |
| 2011/0208557 | A1 | 8/2011 | Gonzalez Diaz et al. |
| 2011/0276507 | A1* | 11/2011 | O'Malley .............. G06Q 10/00 705/321 |
| 2013/0218619 | A1* | 8/2013 | Friedlander .... G06Q 10/063112 705/7.14 |
| 2013/0260357 | A1 | 10/2013 | Reinerman-Jones |
| 2013/0311416 | A1 | 11/2013 | Liu et al. |
| 2017/0154307 | A1 | 6/2017 | Maurya et al. |
| 2019/0102741 | A1* | 4/2019 | Gupta .................. G06Q 10/105 |
| 2019/0188742 | A1* | 6/2019 | Vasu .................. G06Q 30/0204 |
| 2020/0023262 | A1* | 1/2020 | Young ....................... G06T 7/73 |
| 2020/0184494 | A1* | 6/2020 | Joseph ................. G06K 9/6256 |
| 2020/0250603 | A1* | 8/2020 | Rocco ............. G06Q 10/06315 |
| 2021/0110331 | A1* | 4/2021 | Chavan .......... G06Q 10/063118 |

FOREIGN PATENT DOCUMENTS

| | | | |
|---|---|---|---|
| EP | 1376450 B1 | 12/2009 | |
| WO | WO-2013025977 A1 * | 2/2013 | ............. G06Q 10/06 |

OTHER PUBLICATIONS

Edum-Fotwe, Francis T., and Ronald McCaffer. "Developing project management competency: perspectives from the construction industry." International journal of project management 18.2 (2000): 111-124. (Year: 2000).*

Agapiou, Andrew, Andrew DF Price*, and Ron McCaffer. "Planning future construction skill requirements: understanding labour resource issues." Construction Management and Economics 13.2 (1995): 149-161. (Year: 1995).*

Ajit, Pankaj. "Prediction of employee turnover in organizations using machine learning algorithms." algorithms 4.5 (2016): C5. (Year: 2016).*

Jantan, Hamidah, Abdul Razak Hamdan, and Zulaiha Ali Othman. "Human talent prediction in HRM using C4. 5 classification algorithm." International Journal on Computer Science and Engineering 2.8 (2010): 2526-2534. (Year: 2010).*

Shrivastava, Shweta, Kritika Nagdev, and Anupama Rajesh. "Redefining HR using people analytics: the case of Google." Human Resource Management International Digest (2018). (Year: 2018).*

Blikstein, Paulo. "Multimodal learning analytics." Proceedings of the third international conference on learning analytics and knowledge. 2013. (Year: 2013).*

* cited by examiner

US 11,429,908 B2

IDENTIFYING RELATED MESSAGES IN A NATURAL LANGUAGE INTERACTION

BACKGROUND

The present invention relates generally to a method, system, and computer program product for skill requirement forecasting. More particularly, the present invention relates to a method, system, and computer program product for natural language document based skill requirement forecasting.

Workers often work together on projects, also called engagements. Team members may have different skills, or different levels of similar skills. Because not every engagement is exactly like a previous engagement, and team members enter and leave teams, organizations must ensure their workforce is sufficiently skilled to meet the needs of upcoming engagements. Additionally, providing employees with learning opportunities is an attractive benefit when recruiting and retaining the most talented workers. However, providing employees with learning opportunities that do not match an organization's needs might not be cost-effective for the organization.

SUMMARY

The illustrative embodiments provide a method, system, and computer program product. An embodiment includes a method that generates, by executing a natural language processing model on a set of natural language text describing a first engagement, a set of characteristics of the first engagement, the set of characteristics of the first engagement comprising a skillset associated with performing the first engagement. An embodiment generates, by executing the natural language processing model on a set of natural language text describing a future engagement, a set of characteristics of the future engagement. An embodiment determines that the first engagement is above a threshold similarity with the future engagement. An embodiment forecasts, using the skillset used in performing the first engagement, a required skillset of the future engagement. An embodiment generates, by executing the natural language processing model on a set of natural language text describing a current skillset, a set of characteristics of the current skillset. An embodiment generates, using the required skillset of the future engagement and the set of characteristics of the current skillset, a learning path, the learning path describing a set of steps required to transform the current skillset to the required skillset.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
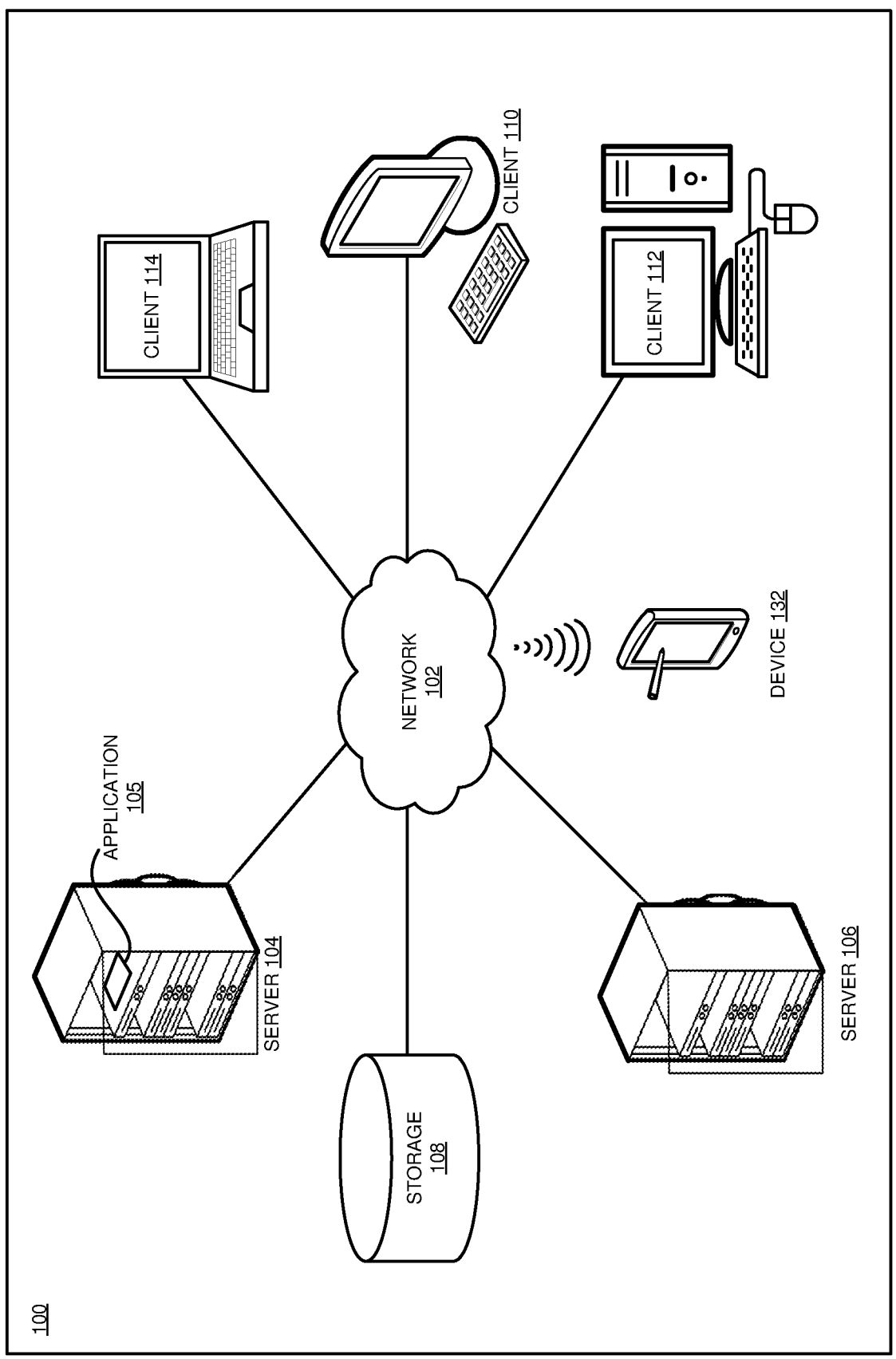
FIG. 1 depicts a block diagram of a network of data processing systems in which illustrative embodiments may be implemented.

The illustrative embodiments recognize that it is difficult to effectively identify future skill needs. Humans often identify future skill needs based on continuity with a past project (e.g., the previous engagement required C programming skills, so this one will too), a problem with a past project (e.g., the previous engagement needed someone with project management skills, so we should add a project manager to the team for this project), an exciting new tool (e.g., this new programming language looks great, let's use it on the next project), team members' interests, and the like, but rarely consider more than a few past engagements and are often not determined in a systematic manner. In addition, engagements and skills are typically described using unstructured data, often using natural language text and diagrams, making data analysis and forecasting difficult for a computer-implemented application to perform.

The illustrative embodiments recognize that it is also difficult to identify workers who already have skills that will be needed in the future, or who could benefit from changing or upgrading their skills to meet future needs. It is also difficult to determine appropriate training in the needed skills. Often, training is too basic or too advanced for a particular worker's current skill level. Training may not be available when a worker has time to devote to training or before a new assignment uses the subject of the training. In addition, a manager may be unaware that someone in a different group already has the required skills and might be interested in transferring to a new team. Reskilling refers to training employees who have skills or areas of expertise that are likely to be underused in an organization into new skills or areas of expertise that that are more likely to be needed. Upskilling refers to providing additional training to employees already exhibiting expertise in a given area to ensure their skills remain up-to-date as they continue in their current job roles. A learning path is a set of courses a learning progresses through to achieve a particular skill or set of skills. For example, a learning path for a learner reskilling from computer hardware engineering to software development might include a sequence of courses in basic, intermediate, and advanced software development in a particular programming language, as well as a course in software testing. Typically, some courses or modules in a learning path must be taken in order (e.g. basic before advanced), but others need not be.

Thus, the illustrative embodiments recognize that there is an unmet need to forecast skill needs from engagement and skill data in natural language form and determine a learning path that meets the forecasted needs.

The illustrative embodiments recognize that the presently available tools or solutions do not address these needs or provide adequate solutions for these needs. The illustrative embodiments used to describe the invention generally address and solve the above-described problems and other problems related to natural language document based skill requirement forecasting.

An embodiment can be implemented as a software application. The application implementing an embodiment can be configured as a modification of an existing training management system, as a separate application that operates in conjunction with an existing training management system, a standalone application, or some combination thereof.

Particularly, some illustrative embodiments provide a method that generates a set of characteristics of a first engagement including a skillset used in performing the engagement, generates a set of characteristics of a future engagement, determining that the first engagement is above a threshold similarity to the future engagement, and uses the skillset used in performing the first engagement to forecast a required skillset of the future engagement. The method uses the required skillset, along with a set of characteristics of a current skillset, to generate a learning path describing a set of steps required to transform the current skillset to the required skillset.

An embodiment receives data describing one or more already-known engagements. An engagement is a project one or more team members work on. An already-known engagement is an actual engagement, either completed or ongoing. For example, a team might just have completed a particular software development project, or might be almost ready to ship a new hardware apparatus. In one embodiment, the engagement has been completed and rated above a threshold level of success, for example for completion on time and on budget. In another embodiment, an already-known engagement is a default engagement selected from a set of default engagements, with selection based on a similarity between the selected default and a future engagement. For example, when planning learning paths for a group of software engineers, a default engagement or set of engagements might be software engineering projects, while when planning learning paths for a group of chemists, a default engagement or set of engagements might be chemistry projects or projects using a particular type of chemistry. Data describing an engagement includes data in unstructured natural language text form. Some non-limiting examples of data in unstructured natural language text form include project proposals, documents of understanding, scopes of work, status reports, and other engagement documentation. Data describing an engagement also includes image data, for example diagrams depicting project phases, charts illustrating project schedules and dependencies, maps, photographs of project components, and the like.

Data describing an already-known engagement also includes information regarding a skillset, or set of skills, associated with performing the engagement. The skillset includes skills actually used in performing the engagement. For example, skills actually used in performing a software development project might include programming in a particular programming language. The skillset can also include skills that are desirable, used in only a portion of the engagement, used if a condition occurs during the engagement, or optional. For example, when performing a software development project debugging and testing might be desirable, or only used in a portion of the engagement, while programming in a language the project does not currently use might be desirable but not required. Information regarding the skillset can also include information on the level of skill, for example an expert-level software developer or an undergraduate student working during the summer.

An embodiment executes a natural language processing model on natural language text describing an already-known engagement, generating a set of characteristics of the engagement and including the skillsets utilized, and the level of expertise exhibited, during an engagement. In embodiments, the natural language processing model uses a presently-available technique to analyze natural language text. In one embodiment, the set of characteristics includes a set of pre-defined predictors, or elements of interest. In one embodiment, predictors are stored in a matrix, in which rows represent particular characteristics and columns represent a value for a particular characteristic associated with a particular engagement. Some predictors are classification predictors, which have binary values (e.g. 0 or 1). Some non-limiting examples of binary predictors include industry classification, information technology (IT) platform classification, and country classification. Some predictors are regression predictors, which have values within a pre-defined range (e.g. 0-1). Some non-limiting examples of binary predictors include engagement length, number of IT systems involved, and number of participants in an engagement.

An embodiment augments the set of characteristics of an already-known engagement by executing a convolutional neural network model on a set of image data describing the engagement. In embodiments, the convolutional neural network model uses a presently-available technique to analyze images and the image portions of documents.

An embodiment augments the set of characteristics of an already-known engagement using input from a human expert. In one embodiment, expert input is provided in a structured form, for example via a user interface or database.

For example, a project manager or individual participants might provide information of the skillsets utilized in order to complete the engagement, indicating the level of expertise needed with each skillset.

An embodiment receives data describing one or more future engagements. A future engagement is a project one or more team members expect to work on, for which they will use skills they currently have or skills they need to acquire. For example, a team might be planning to start a new software development project, and want to plan training so that appropriate skills are available within the team when needed for the new project. An embodiment executes a natural language processing model on natural language text describing a future engagement, generating a set of characteristics of the future engagement. In embodiments, the natural language processing model uses a presently-available technique to analyze natural language text, and may be the same or different from the model used to analyze data of a completed or ongoing engagement. In one embodiment, the set of characteristics includes a set of pre-defined predictors, or elements of interest. In one embodiment, predictors, including classification and regression predictors, are stored in a matrix in a manner described herein.

An embodiment augments the set of characteristics of a future engagement by executing a convolutional neural network model on a set of image data describing the future engagement. In embodiments, the convolutional neural network model uses a presently-available technique to analyze images and the image portions of documents, and may be the same or different from the model used to analyze data of a completed or ongoing engagement.

In addition, an embodiment uses data describing one or more engagements to extrapolate additional future engagements that may not yet have been proposed, entered into an engagement management system as proposed future engagements, or otherwise explicitly documented, then analyzes data of the extrapolated future engagements in a manner described herein. One embodiment analyzes data of past and ongoing engagements to determine a cyclical engagement pattern. One non-limiting example of a cyclical, or recurring, engagement pattern is a particular bank typically embarking on a mainframe modernization program every three years. Another embodiment analyzes data of other engagements of other providers offering similar services in the same or similar industry sectors. For example, future engagements of an IT consulting organization specializing in government contracts are likely to be similar to future engagements other IT consulting organizations specializing in government contracts are expecting to work on. Another embodiment analyzes data of speculative future engagements that may or may not become proposed to a customer or entered into an engagement management system as proposed future engagements. For example, an IT consulting organization specializing in government contracts might be contemplating a move into a different industry sector, but has not yet identified prospective customers in the new sector or marketed proposed engagements to those prospective customers.

An embodiment determines that a future engagement is above a threshold similarity with one or more already-known engagements. To determine similarity, an embodiment performs a clustering technique to group sets of characteristics of already-known engagements and the set of characteristics of the future engagement. One non-limiting example of a presently-known clustering technique is the K-Nearest Neighbors algorithm; other clustering techniques are also available and contemplated within the scope of the present embodiments. In particular, an embodiment plots a data point for a future engagement onto an approximation graph based upon the engagement's classification and regression predictors determined in a manner described herein. The closer two points are within the graph, the more similar two corresponding engagements are. Thus, an embodiment also plots data points for already-known engagements onto the graph. An embodiment computes a distance between the data point for the future engagement and data points for already-known engagements, and selects a set of already-known engagements with data points that are closest to the data point of the future engagement. When using the K-Nearest Neighbors algorithm, an embodiment selects a predefined number (K) of nearest data points. Another embodiment performs nearest data point plotting and selection multiple times, with different values of K, stopping when results for each performance are within a threshold level of consistency with each other. Another embodiment selects a set of nearest data points based on relative distances between data points, or using another technique. As a result, engagements corresponding to the set of nearest data points have above a threshold similarity with the future engagement. One embodiment combines engagements corresponding to the selected data points by calculating the mean (for regression predictors) or mode (for classification predictors) of the engagements being combined.

An embodiment uses one or more skillsets utilized, and the level of expertise exhibited, during one or more of the most similar already-known engagements to forecast a required skillset of the future engagement. In particular, because engagements corresponding to the set of nearest data points have above a threshold similarity with the future engagement, skillsets determined for the already-known engagements will also have above a threshold similarity with skillsets required in the future engagement.

An embodiment receives data describing one or more skillsets of workers who are candidates for working on a future engagement. In one embodiment, the data includes descriptions of skillsets, or relationships of skills to each other, that is not necessarily specific to a particular worker. For example, this data might include a description of the skills a typical programmer working as a full stack developer might have, including particular programming languages and soft skills such as team leadership. An embodiment executes a natural language processing model on natural language text describing the skillsets, generating a set of characteristics of the skillset. Some non-limiting examples of natural language text describing skillsets are worker resumes, job descriptions, recruitment criteria for open positions, and engagement documents describing capabilities of team members working on, or proposed to work on, an engagement. The natural language processing model uses a presently-available technique to analyze natural language text, and may be the same or different from the model used to analyze engagement data. In one embodiment, the set of characteristics includes a set of pre-defined predictors, or elements of interest. In one embodiment, predictors, including classification and regression predictors, are stored in a matrix in a manner described herein.

An embodiment augments the set of characteristics of a skillset by executing a convolutional neural network model on a set of image data describing the skillset. In embodiments, the convolutional neural network model uses a presently-available technique to analyze images and the image portions of documents, and may be the same or different from the model used to analyze engagement data.

An embodiment augments the set of characteristics of a skillset using input from a human expert. In one embodiment, expert input is provided in a structured form, for example via a user interface or database. For example, a manager, human resources professional, or individual participants might provide skillset and level of expertise information.

An embodiment uses a required skillset of a future engagement and the set of characteristics of the currently available skillset to generate a learning path describing a set of steps required to transform the current skillset to the required skillset. For some team members, the learning path can include upskilling. For example, although a team member is already an expert in a particular programming language, because the future engagement is forecast to use a new programming language, this team member might be offered a course in the new language, geared to developers who already know the first language. For other team members, the learning path can include reskilling. For example, although a team member is already an expert hardware engineer, the team's next engagement is not forecast to use any hardware engineering skills. Thus, this team member might be offered a sequence of courses in basic, intermediate, and advanced software development in a particular programming language, as well as a course in software testing.

An embodiment stores sets of characteristics for engagements and skillsets in a skills engagement corpus. Stored sets of characteristics can be used to analyze additional future engagements and skillsets. In embodiments, the skills engagement corpus includes additional data, for example an ontology relating skills to other skills.

The manner of natural language document based skill requirement forecasting described herein is unavailable in the presently available methods in the technological field of endeavor pertaining to skill requirement forecasting. A method of an embodiment described herein, when implemented to execute on a device or data processing system, comprises substantial advancement of the functionality of that device or data processing system in generating a set of characteristics of a first engagement including a skillset used in performing the engagement, generating a set of characteristics of a future engagement, determining that the first engagement is above a threshold similarity to the future engagement, and using the skillset used in performing the first engagement to forecast a required skillset of the future engagement. The method uses the required skillset, along with a set of characteristics of a current skillset, to generate a learning path describing a set of steps required to transform the current skillset to the required skillset.

The illustrative embodiments are described with respect to certain types of engagements, skills, skillsets, clusters, thresholds, types of data, forecasts, thresholds, rankings, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
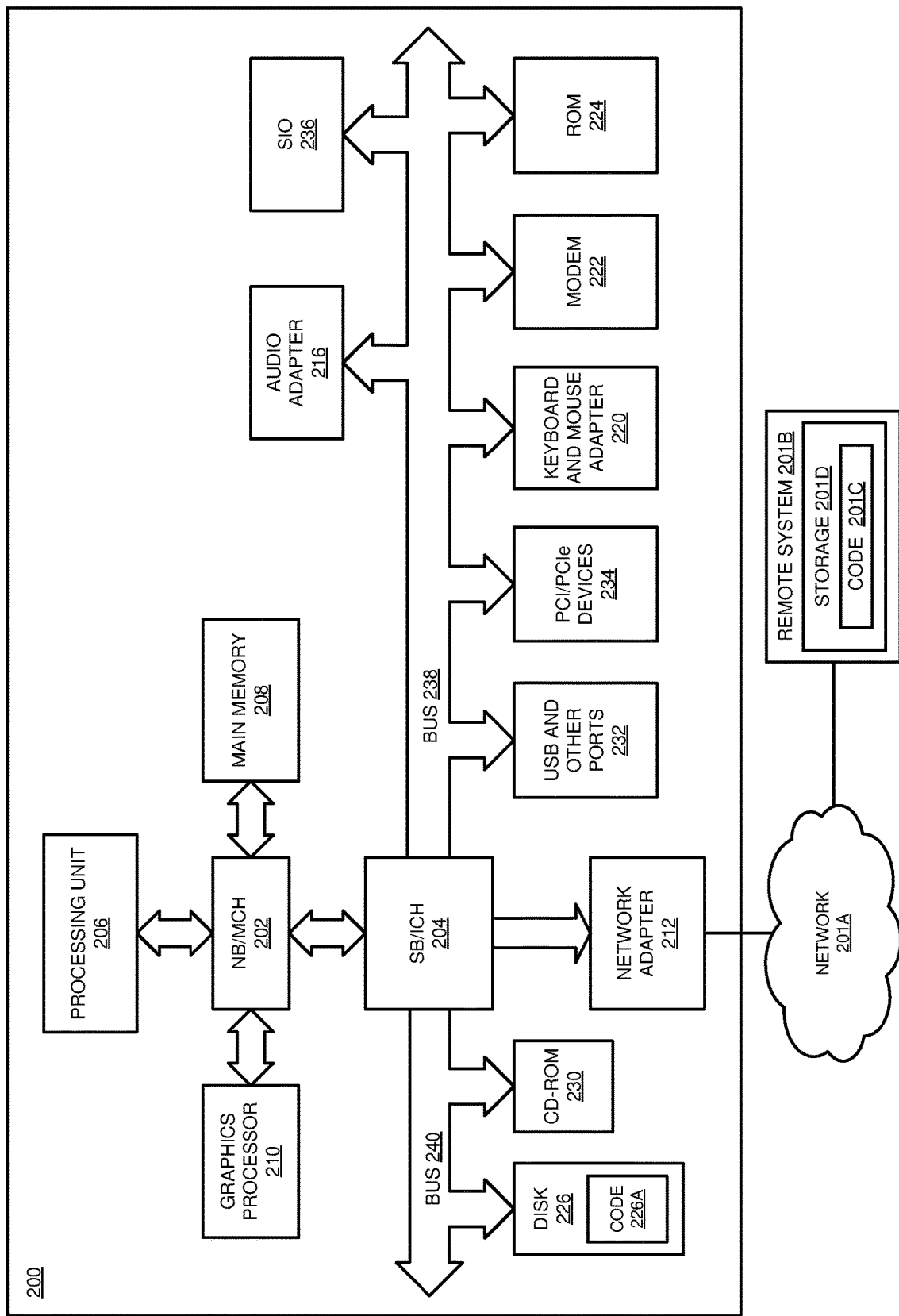
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
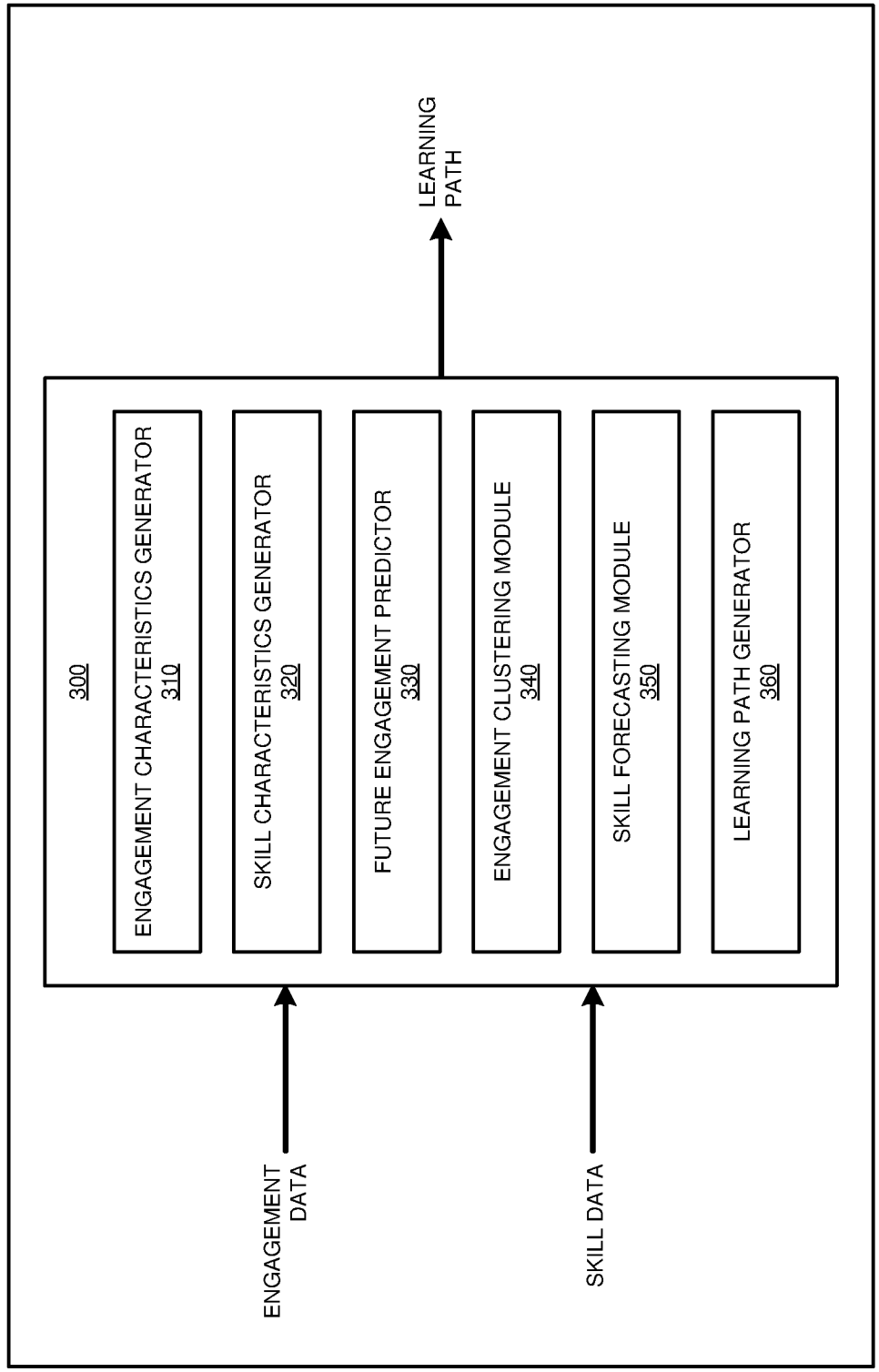
FIG. 3 depicts a block diagram of an example configuration for natural language document based skill requirement forecasting in accordance with an illustrative embodiment.

With reference to FIG. 3, this figure depicts a block diagram of an example configuration for natural language document based skill requirement forecasting in accordance with an illustrative embodiment. Application 300 is an example of application 105 in FIG. 1 and executes in any of servers 104 and 106, clients 110, 112, and 114, and device 132 in FIG. 1.

Engagement characteristics generator 310 receives data describing one or more engagements. In one implementation of module 310, the engagement has been completed and rated above a threshold level of success. In another implementation of module 310, an already-known engagement is a default engagement selected from a set of default engagements, with selection based on a similarity between the selected default and a future engagement. Data describing an engagement includes data in unstructured natural language text form and image data. Data describing an already-known engagement also includes information regarding a skillset, or set of skills, associated with performing the engagement. The skillset includes skills actually used in performing the engagement, and can also include skills that are desirable, used in only a portion of the engagement, used if a condition occurs during the engagement, or optional. Information regarding the skillset can also include information on the level of skill.

Engagement characteristics generator 310 executes a natural language processing model on natural language text describing an engagement, generating a set of characteristics of the engagement and including the skillsets utilized, and the level of expertise exhibited, during an already-known engagement. Module 310 augments the set of characteristics of an engagement by executing a convolutional neural network model on a set of image data describing the engagement. Module 310 also augments the set of characteristics of an already-known engagement using input from a human expert, provided in structured or unstructured form.

Future engagement predictor 330 uses data describing one or more engagements to extrapolate additional future engagements that may not yet have been proposed, entered into an engagement management system as proposed future engagements, or otherwise explicitly documented, then analyzes data of the extrapolated future engagements in a manner described herein. One implementation of predictor 330 analyzes data of past and ongoing engagements to determine a cyclical engagement pattern. Another implementation of predictor 330 analyzes data of other engagements of other providers offering similar services in the same or similar industry sectors. Another implementation of predictor 330 analyzes data of speculative future engagements that may or may not become proposed to a customer or entered into an engagement management system as proposed future engagements.

Engagement clustering module 340 determines that a future engagement is above a threshold similarity with one or more already-known engagements. To determine similarity, module 340 performs a clustering technique, such as the K-Nearest Neighbors algorithm, to group sets of characteristics of already-known engagements and the set of characteristics of the future engagement. In particular, module 340 plots a data point for a future engagement onto an approximation graph based upon the engagement's classification and regression predictors determined in a manner described herein. Module 340 also plots data points for already-known engagements onto the graph. Module 340 computes a distance between the data point for the future engagement and data points for already-known engagements, and selects a set of already-known engagements with data points that are closest to the data point of the future engagement. When using the K-Nearest Neighbors algorithm, module 340 selects a predefined number (K) of nearest data points. Another implementation of module 340 performs nearest data point plotting and selection multiple times, with different values of K, stopping when results for each performance are within a threshold level of consistency with each other. Another implementation of module 340 selects a set of nearest data points based on relative distances between data points, or using another technique. As a result, engagements corresponding to the set of nearest data points have above a threshold similarity with the future engagement.

Skill forecasting module 350 uses one or more skillsets utilized, and the level of expertise exhibited, during one or more of the most similar already-known engagements to forecast a required skillset of the future engagement. In particular, because engagements corresponding to the set of nearest data points have above a threshold similarity with the future engagement, skillsets determined for the already-known engagements will also have above a threshold similarity with skillsets required in the future engagement.

Skill characteristics generator 320 receives data describing one or more skillsets of workers who are candidates for working on a future engagement. In one implementation of module 320, the data includes descriptions of skillsets, or relationships of skills to each other, that is not necessarily specific to a particular worker. Module 320 executes a natural language processing model on natural language text describing the skillsets, generating a set of characteristics of the skillset. Module 320 augments the set of characteristics of a skillset by executing a convolutional neural network model on a set of image data describing the skillset. Module 320 also augments the set of characteristics of a skillset using input from a human expert. In one implementation of module 320, expert input is provided in a structured form.

Learning path generator 360 uses a required skillset of a future engagement and the set of characteristics of the currently available skillset to generate a learning path describing a set of steps required to transform the current skillset to the required skillset. For some team members, the learning path can include upskilling. For other team members, the learning path can include reskilling.

Figure 4:
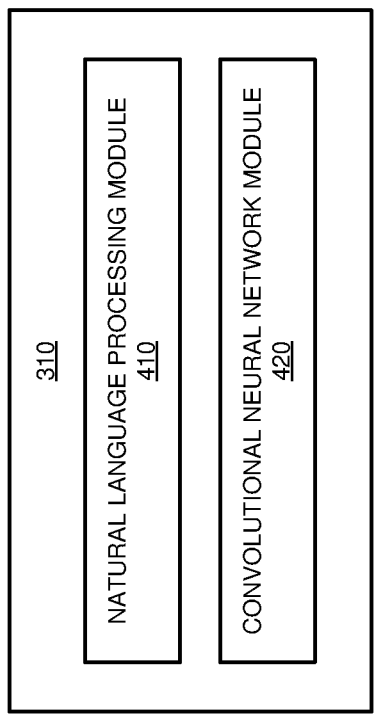
FIG. 4 depicts a block diagram of an example configuration for natural language document based skill requirement forecasting in accordance with an illustrative embodiment.

With reference to FIG. 4, this figure depicts a block diagram of an example configuration for natural language document based skill requirement forecasting in accordance with an illustrative embodiment. FIG. 4 depicts more detail of engagement characteristics generator 310 in FIG. 3.

Natural language processing module 410 executes a natural language processing model on natural language text describing an already-known or future engagement, generating a set of characteristics of the engagement and including the skillsets utilized, and the level of expertise exhibited, during an engagement. The natural language processing model uses a presently-available technique to analyze natural language text. The set of characteristics includes a set of pre-defined predictors, or elements of interest. Predictors are stored in a matrix, in which rows represent particular characteristics and columns represent a value for a particular characteristic associated with a particular engagement. Some predictors are classification predictors, and some predictors are regression predictors.

Convolutional neural network module 420 augments the set of characteristics of an engagement by executing a convolutional neural network model on a set of image data describing the engagement. The convolutional neural network model uses a presently-available technique to analyze images and the image portions of documents.

Figure 5:
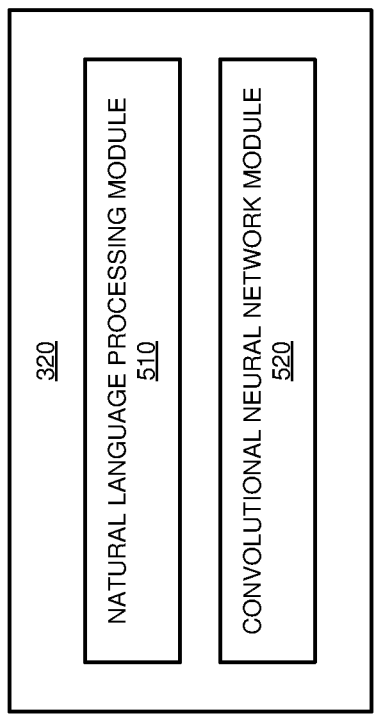
FIG. 5 depicts a block diagram of an example configuration for natural language document based skill requirement forecasting in accordance with an illustrative embodiment.

With reference to FIG. 5, this figure depicts a block diagram of an example configuration for natural language document based skill requirement forecasting in accordance with an illustrative embodiment. FIG. 5 depicts more detail of skill characteristics generator 320 in FIG. 3.

Natural language processing module 510 executes a natural language processing model on natural language text describing skillsets, generating a set of characteristics of a skillset. The natural language processing model uses a presently-available technique to analyze natural language text, and may be the same or different from the model used to analyze engagement data. The set of characteristics includes a set of pre-defined predictors that are stored in a matrix in a manner described herein.

Convolutional neural network module 520 augments the set of characteristics of a skillset by executing a convolutional neural network model on a set of image data describing the skillset. The convolutional neural network model uses a presently-available technique to analyze images and the image portions of documents, and may be the same or different from the model used to analyze engagement data.

Figure 6:
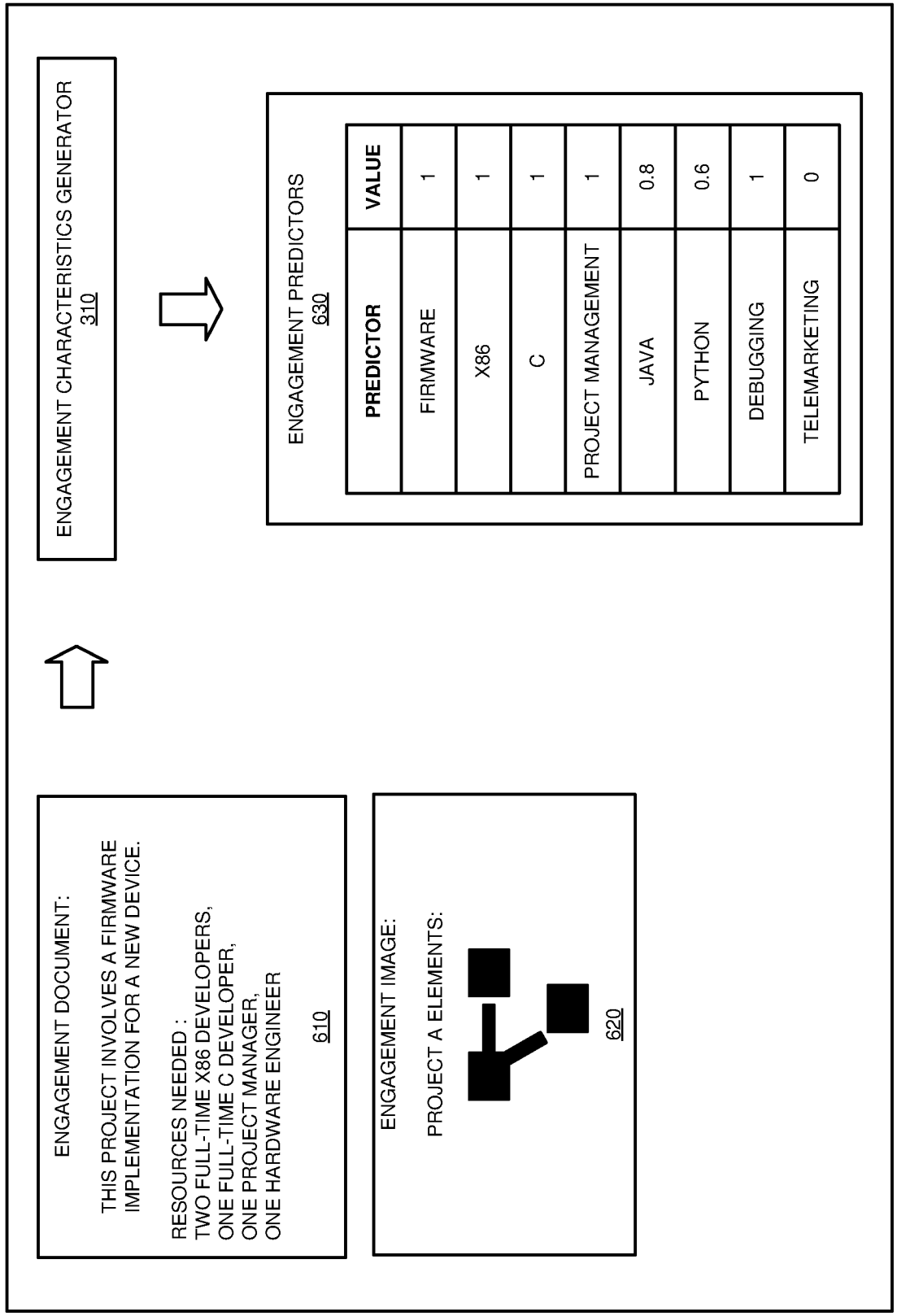
FIG. 6 depicts an example of natural language document based skill requirement forecasting in accordance with an illustrative embodiment.

With reference to FIG. 6, this figure depicts an example of natural language document based skill requirement forecasting in accordance with an illustrative embodiment. The example can be executed using application 300 in FIG. 3. Engagement characteristics generator 310 is the same as engagement characteristics generator 310 in FIG. 3.

As depicted, engagement characteristics generator 310 receives data describing one or more engagements. Engagement document 610 is an example of engagement data in unstructured natural language text form, and provides a brief description of a project, Project A, and resources needed in performing the project. Engagement image 620 is an example of engagement data in image form, and provides a diagram of elements of Project A. Document 610 and image 620 are only two examples of engagement data, and in practice module 310 would likely receive much more engagement data to analyze.

Module 310 analyzes document 610 and image 620, as well as other data that is not depicted, and generates engagement predictors 630, a set of characteristics of the engagement and the skillsets utilized during the engagement. Predictors with a value of 1, on a 0-1 scale, reference skills that are definitely required to complete Project A. For example, because document 610 references a firmware implementation, the firmware skill has a value of 1. Predictors with a value of 0 reference skills that are definitely not required to complete Project A. For example, because document 610 references a firmware implementation, and application 300 has determined from other data that telemarketing skill is not required in a firmware implementation, the telemarketing skill has a value of 0. Predictors with a value between 0 and 1 reference skills that have some relationship to completing Project A. For example, because document 610 references developing in C, a programming language, predictors referencing skill in programming in Java and Python, programming languages with some similar features as C, have values of 0.8 and 0.6 according to their similarity to programming in C. (Python is a registered trademark of the Python Software Foundation in the United States and other countries. Java is a registered trademark of Oracle in the United States and other countries.) The examples given are only examples, and not meant to imply any actual assessment of degrees of similarity of various programming languages for particular purposes.

Figure 7:
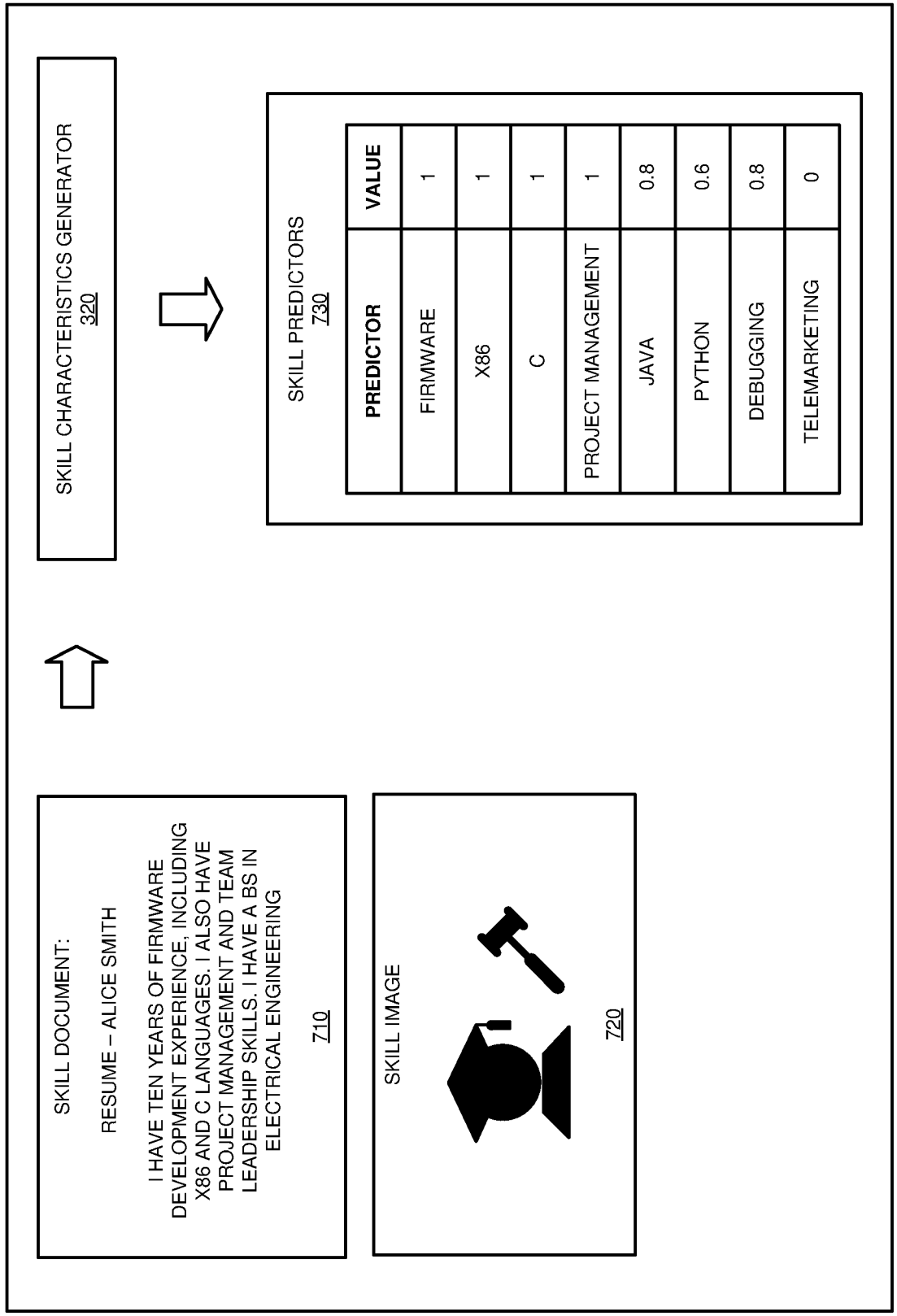
FIG. 7 depicts an example of natural language document based skill requirement forecasting in accordance with an illustrative embodiment.

With reference to FIG. 7, this figure depicts an example of natural language document based skill requirement forecasting in accordance with an illustrative embodiment. The example can be executed using application 300 in FIG. 3. Skill characteristics generator 320 is the same as engagement characteristics generator 320 in FIG. 3.

As depicted, skill characteristics generator 320 receives data describing one or more skills of a team member, Alice Smith. Skill document 710 is an example of skill data in unstructured natural language text form, and provides a brief excerpt from Alice Smith's resume, describing her experience and skills. Engagement image 720 is an example of skill data in image form, and provides some symbols representing Alice Smith's skills. Document 710 and image 720 are only two examples of skill data, and are not intended to imply any particular level of experience or skills required to complete any particular project.

Module 320 analyzes document 710 and image 720, as well as other data that is not depicted, and generates skill predictors 730, a set of characteristics of Alice Smith's skillset. Predictors with a value of 1, on a 0-1 scale, reference skills she definitely possesses. For example, because document 710 references firmware development experience, the firmware skill has a value of 1. Predictors with a value of 0 reference skills she is not known to possess. For example, because document 710 references firmware development experience, and application 300 has determined from other data that telemarketing skill is not required in firmware development, the telemarketing skill has a value of 0. Predictors with a value between 0 and 1 reference skills that have some relationship to skills Alice Smith has. For example, because document 710 references developing in C, predictors referencing skill in programming in Java and Python, have values of 0.8 and 0.6 according to their similarity to programming in C.

Figure 8:
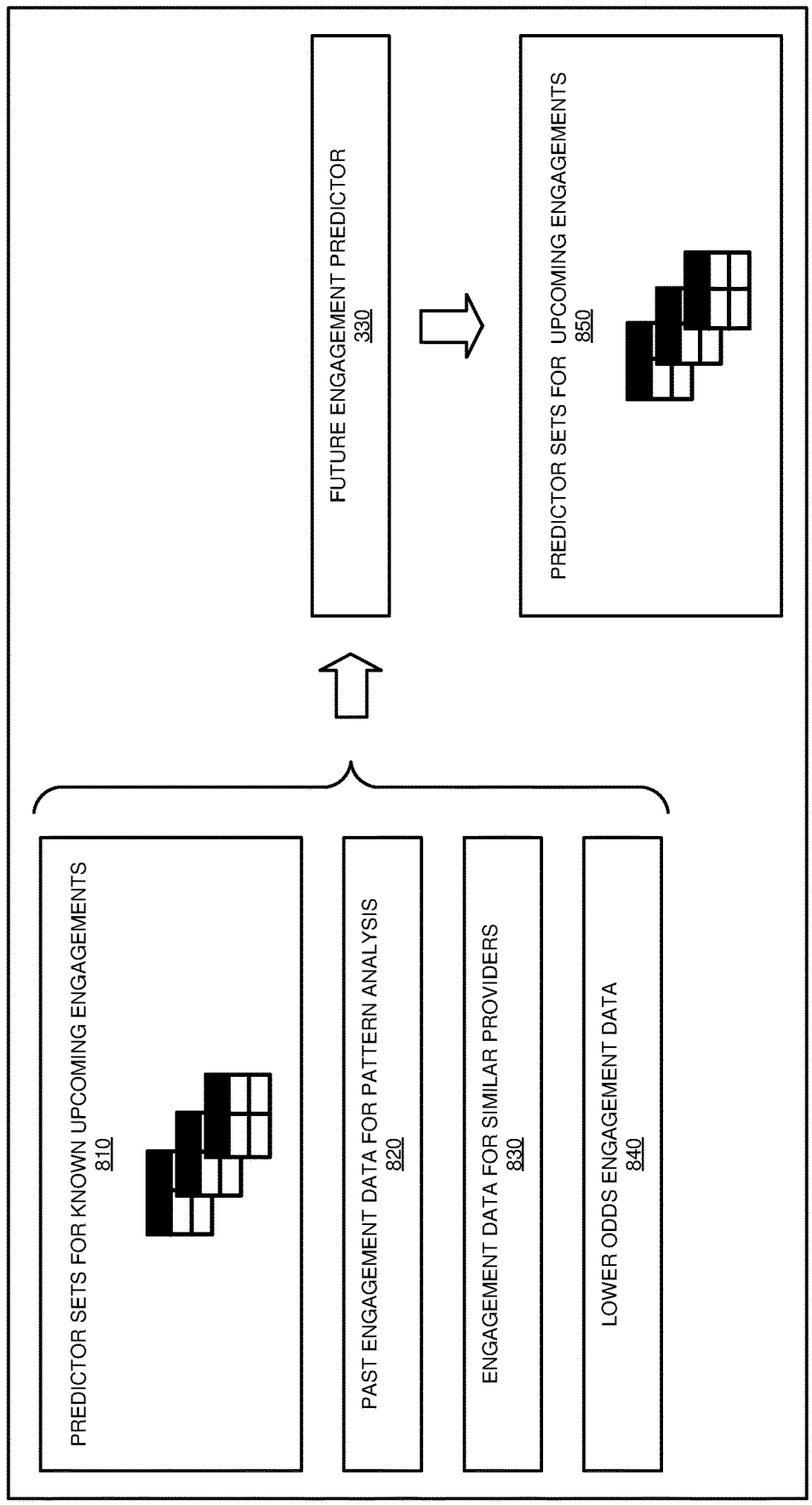
FIG. 8 depicts an example of natural language document based skill requirement forecasting in accordance with an illustrative embodiment.

With reference to FIG. 8, this figure depicts an example of natural language document based skill requirement forecasting in accordance with an illustrative embodiment. The example can be executed using application 300 in FIG. 3. Future engagement predictor 330 is the same as future engagement predictor 330 in FIG. 3.

As depicted, application 300 has already generated predictor sets for known upcoming engagements 810, using data describing one or more future engagements in a manner described herein. Future engagement predictor 330 analyzes data set 820, past engagement data for pattern analysis, to determine a cyclical engagement pattern. Module 330 analyzes data set 830, data of other engagements of other providers offering similar services in the same or similar industry sectors. Module 330 also analyzes data set 840, lower odds engagement data, which is data of speculative future engagements that may or may not become proposed to a customer or entered into an engagement management system as proposed future engagements. Module 330 adds the analysis results to predictor set 810, resulting in predictor sets for upcoming engagements 850.

Figure 9:
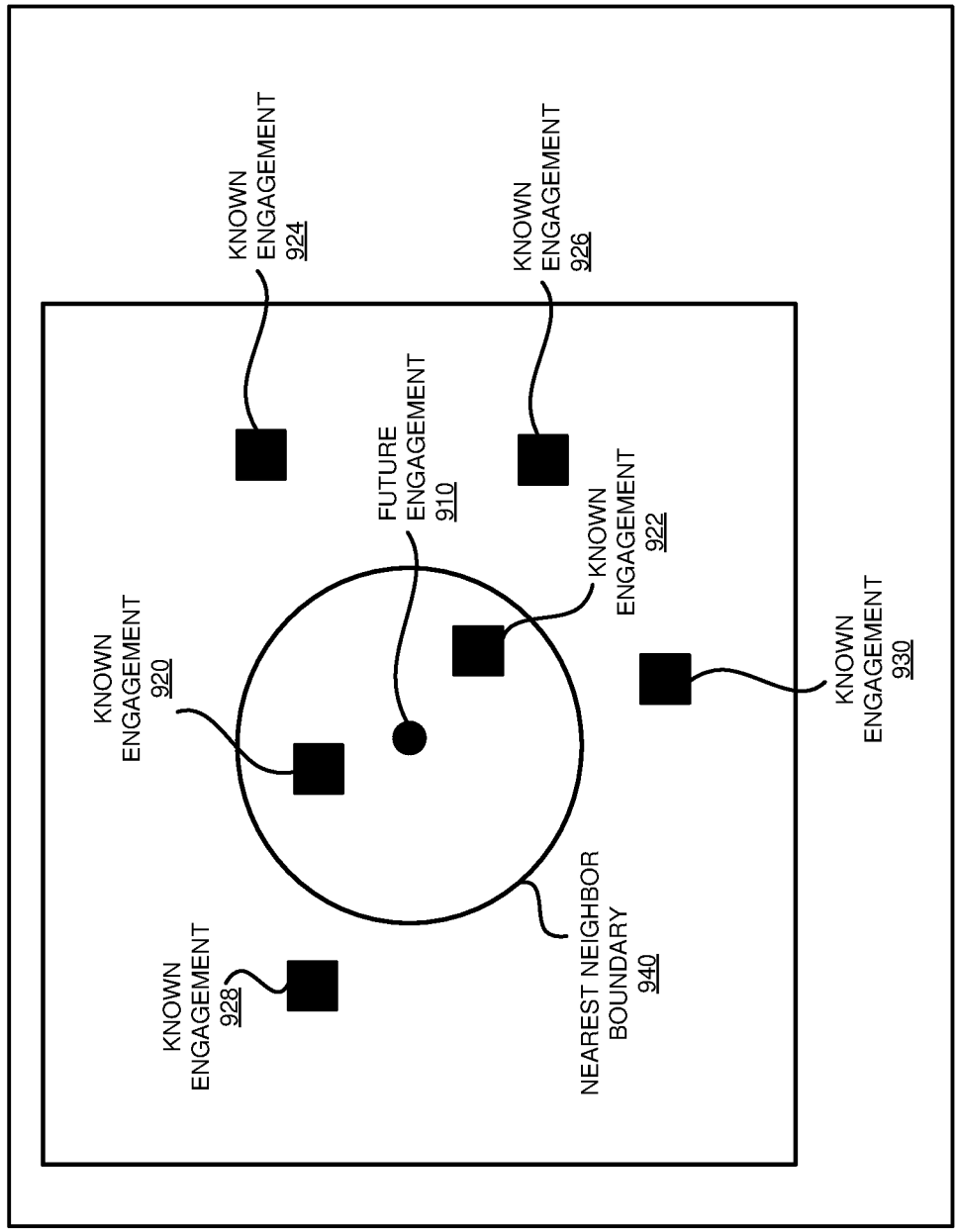
FIG. 9 depicts an example of natural language document based skill requirement forecasting in accordance with an illustrative embodiment.

With reference to FIG. 9, this figure depicts an example of natural language document based skill requirement forecasting in accordance with an illustrative embodiment. The example can be executed using application 300 in FIG. 3.

In particular, FIG. 9 depicts determining that a future engagement is above a threshold similarity with one or more already-known engagements, using a clustering technique to group sets of characteristics of already-known engagements and the set of characteristics of the future engagement. In particular, application 300 plots a data point representing future engagement 910 onto an approximation graph based upon the engagement's classification and regression predictors determined in a manner described herein. The closer two points are within the graph, the more similar two corresponding engagements are. Thus, application 300 also plots data points representing known engagements 920, 922, 924, 926, 928, and 930 onto the graph. Application 300 computes a distance between the data point representing future engagement 910 and the data points representing known engagements 920, 922, 924, 926, 928, and 930. Because the data points representing engagements 920 and 922 are within nearest neighbor boundary 940, application 300 selects engagements 920 and 922 as engagements most similar to future engagement 910.

Figure 10:
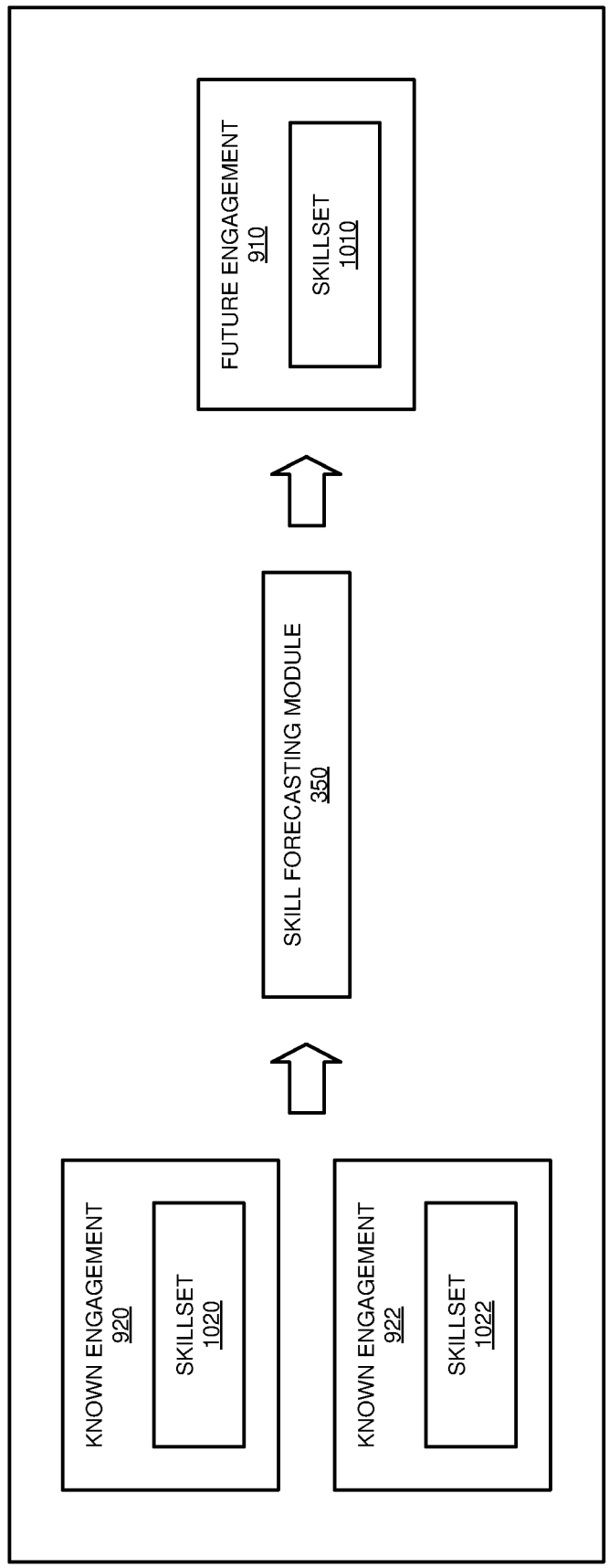
FIG. 10 depicts a continued example of natural language document based skill requirement forecasting in accordance with an illustrative embodiment.

With reference to FIG. 10, this figure depicts a continued example of natural language document based skill requirement forecasting in accordance with an illustrative embodiment. Skill forecasting module 350 is the same as skill forecasting module 350 in FIG. 3. Known engagements 920 and 922 and future engagement 910 are the same as known engagements 920 and 922 and future engagement 910 in FIG. 9.

As depicted, known engagement 920 includes skillset 1020, used in performing engagement 920 and known engagement 922 includes skillset 1022, used in performing skillset 1022. Because engagements 920 and 922 have above a threshold similarity with future engagement 910, skill forecasting module 350 uses skillsets 1020 and 1022 to forecast skillset 1010, a required skillset of future engagement 910.

Figure 11:
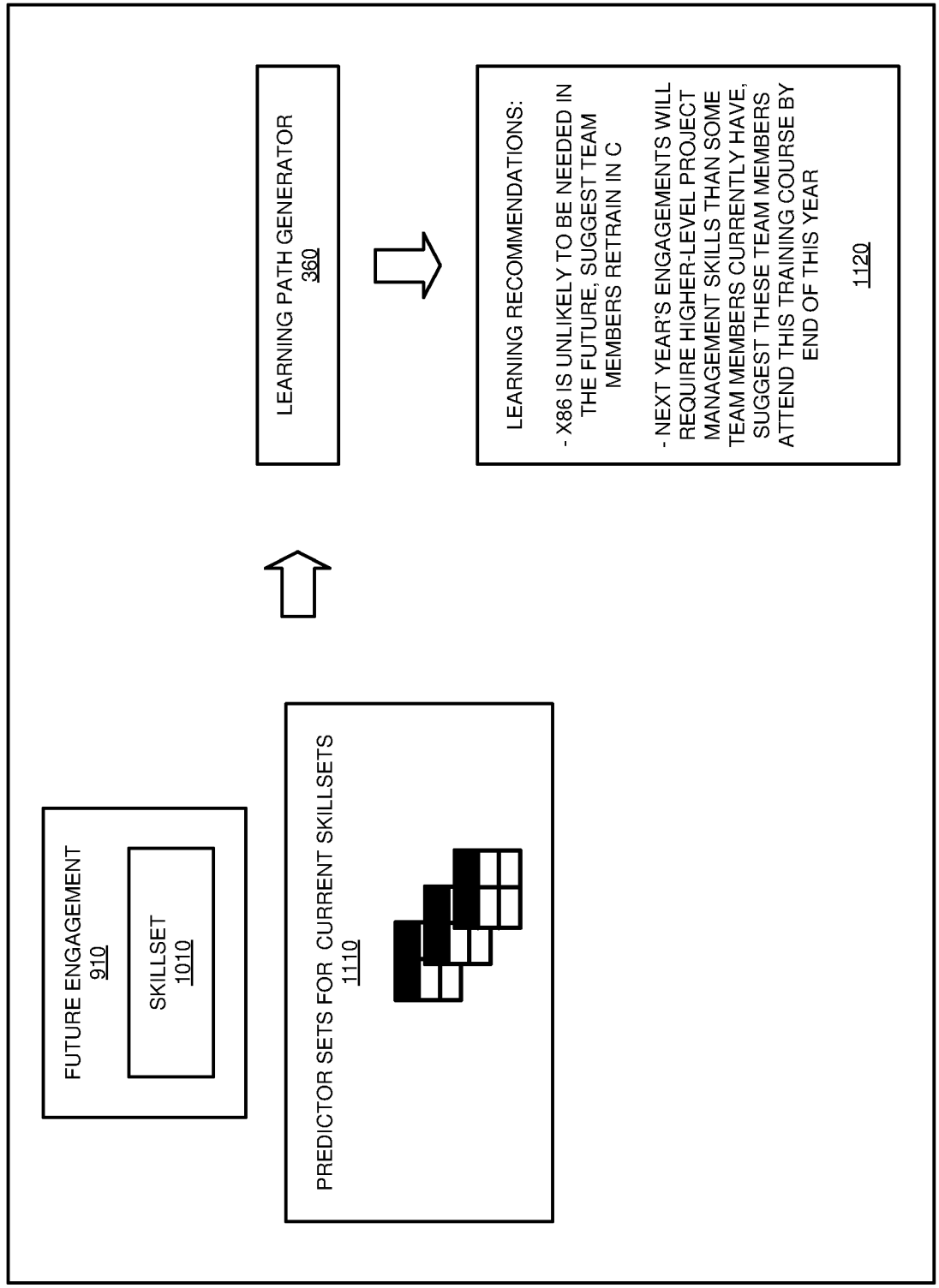
FIG. 11 depicts a continued example of natural language document based skill requirement forecasting in accordance with an illustrative embodiment.

With reference to FIG. 11, this figure depicts a continued example of natural language document based skill requirement forecasting in accordance with an illustrative embodiment. Learning path generator 360 is the same as learning path generator 360 in FIG. 3. Future engagement 910 and skillset 1010 are the same as future engagement 910 and skillset 1010 in FIG. 10.

Learning path generator 360 uses required skillset 1010 of future engagement 910 and predictor sets 1110, representing sets of characteristics of currently available skillsets, to generate learning recommendations 1120, suggesting learning paths including upskilling and reskilling.

Figure 12:
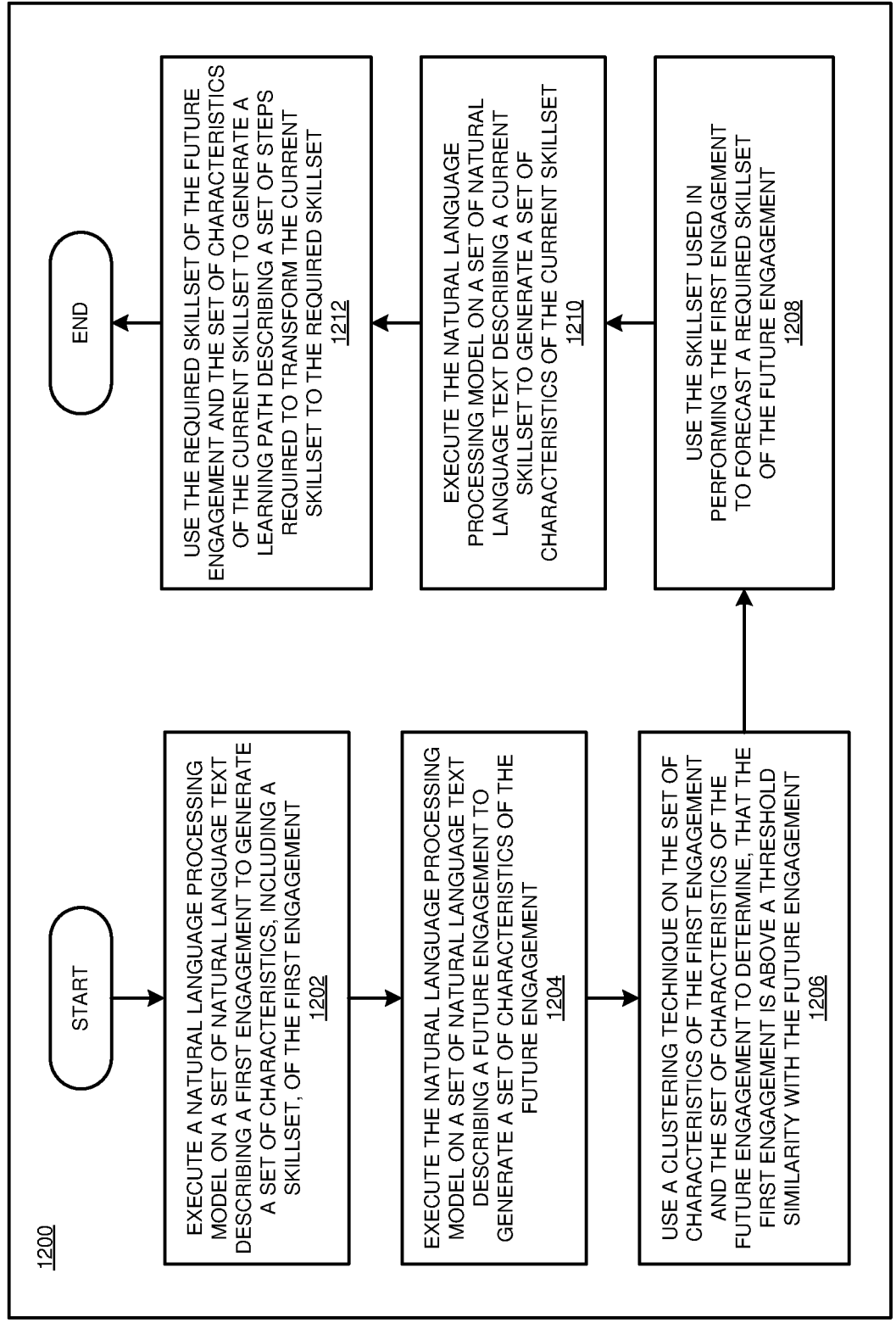
FIG. 12 depicts a flowchart of an example process for natural language document based skill requirement forecasting in accordance with an illustrative embodiment.

With reference to FIG. 12, this figure depicts a flowchart of an example process for natural language document based skill requirement forecasting in accordance with an illustrative embodiment. Process 1200 can be implemented in application 300 in FIG. 3.

In block 1202, the application executes a natural language processing model on a set of natural language text describing a first engagement to generate a set of characteristics, including a skillset, of the first engagement. In block 1204, the application executes the natural language processing model on a set of natural language text describing a future engagement to generate a set of characteristics of the future engagement. In block 1206, the application uses a clustering technique on the set of characteristics of the first engagement and the set of characteristics of the future engagement to determine, that the first engagement is above a threshold similarity with the future engagement. In block 1208, the application uses the skillset used in performing the first engagement to forecast a required skillset of the future engagement. In block 1210, the application executes the natural language processing model on a set of natural language text describing a current skillset to generate a set of characteristics of the current skillset. In block 1212, the application uses the required skillset of the future engagement and the set of characteristics of the current skillset to generate a learning path describing a set of steps required to transform the current skillset to the required skillset. Then the application ends.

Figure 13:
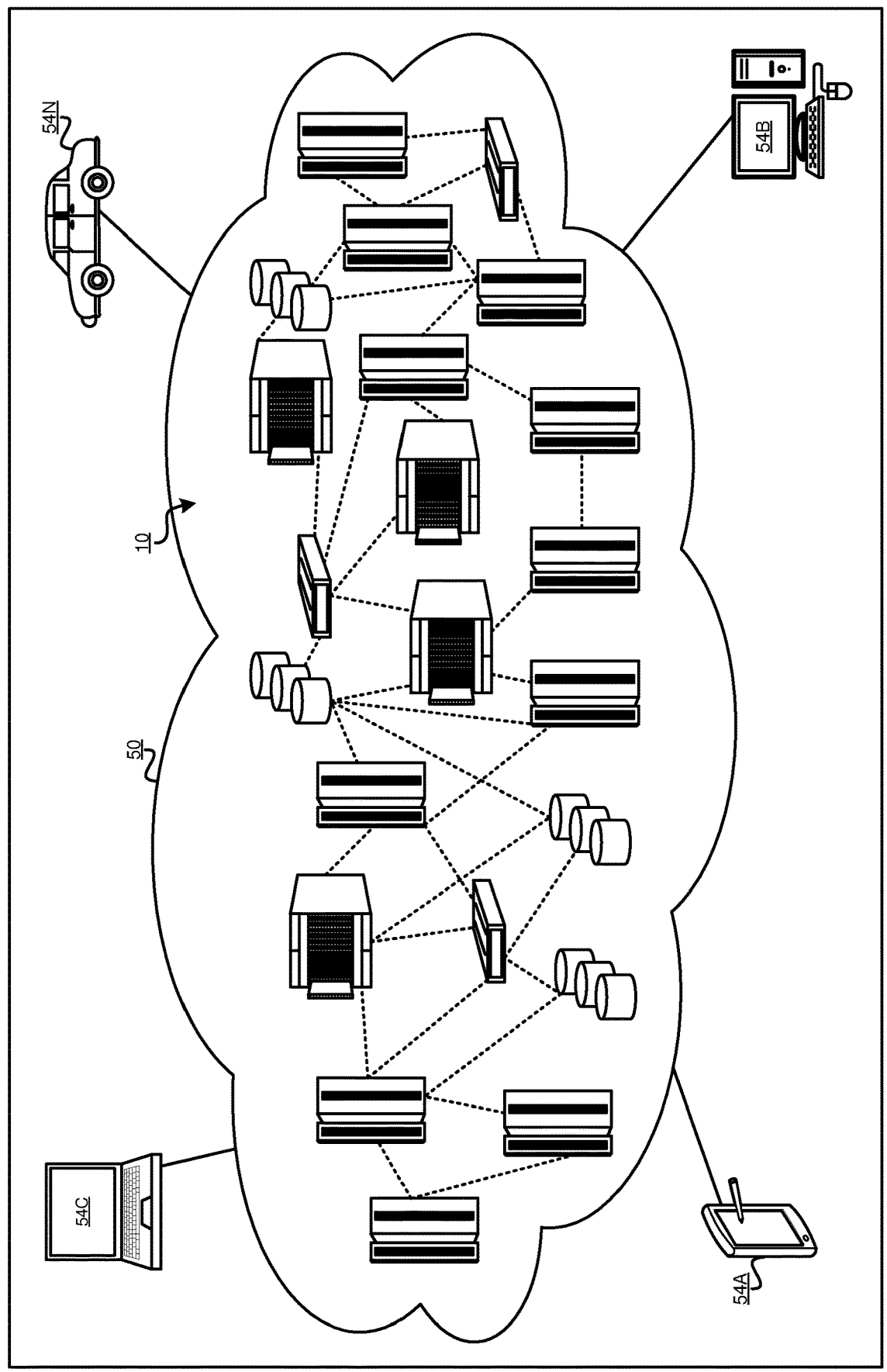
FIG. 13 depicts a cloud computing environment according to an embodiment of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 14:
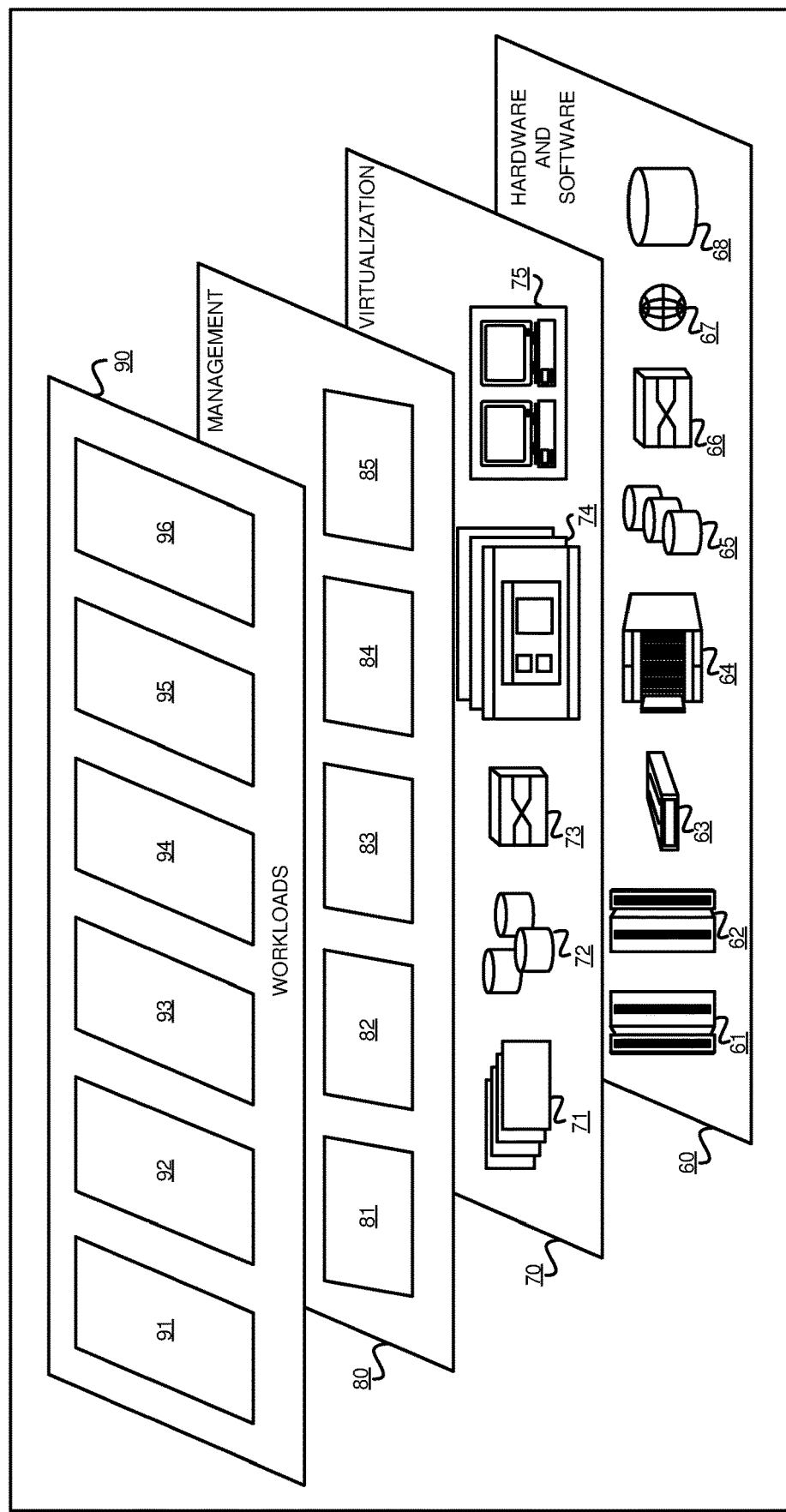
FIG. 14 depicts abstraction model layers according to an embodiment of the present invention.

Referring now to FIG. 14, a set of functional abstraction layers provided by cloud computing environment 50 (FIG. 13) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for natural language document based skill requirement forecasting and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
constructing a software application interfacing with a training management system, the software application comprising a forecasting function enhancing a training selection functionality of the training management system by:

generating, by executing a natural language processing model analyzing a set of natural language text describing a first engagement, a set of characteristics of the first engagement, the set of characteristics of the first engagement comprising a skillset associated with performing the first engagement;

generating, by executing the natural language processing model analyzing a set of natural language text describing a future engagement and by analyzing, using a convolutional neural network, a set of image data describing the future engagement, a set of characteristics of the future engagement, the future engagement comprising a project expected to commence in the future;

determining, by using a clustering technique on a plurality of data points, that the first engagement is above a threshold similarity with the future engagement, wherein a data point in the plurality of data points corresponds to a set of characteristics of an engagement in a plurality of engagements, the plurality of engagements including the first engagement and the future engagement;

forecasting, using the skillset used in performing the first engagement, a required skillset of the future engagement;

generating, by executing the natural language processing model analyzing a set of natural language text describing a current skillset, a set of characteristics of the current skillset; and generating, using the required skillset of the future engagement and the set of characteristics of the current skillset, a learning path, the learning path describing a set of steps required to transform the current skillset to the required skillset.

2. The computer-implemented method of claim 1, wherein the first engagement comprises a completed engagement.

3. The computer-implemented method of claim 1, wherein the first engagement comprises an ongoing engagement.

4. The computer-implemented method of claim 1, wherein the set of characteristics of the first engagement comprises a skillset used in performing the first engagement.

5. The computer-implemented method of claim 1, wherein the set of characteristics of the first engagement comprises a level of skill of a skillset used in performing the first engagement.

6. The computer-implemented method of claim 1, further comprising:
augmenting, by executing a convolutional neural network model on a set of image data describing the first engagement, the set of characteristics of the first engagement.

7. The computer-implemented method of claim 1, wherein the software application interfaces with an engagement management system to extrapolate a second future engagement from a cyclical engagement pattern.

8. A computer program product for natural language document based skill requirement forecasting, the computer program product comprising:
one or more computer readable storage media, and program instructions collectively stored on the one or more computer readable storage media, the program instructions comprising:
program instructions to construct a software application interfacing with a training management system, the software application comprising a forecasting function enhancing a training selection functionality of the training management system by:
  generating, by executing a natural language processing model analyzing a set of natural language text describing a first engagement, a set of characteristics of the first engagement, the set of characteristics of the first engagement comprising a skillset associated with performing the first engagement;
  generating, by executing the natural language processing model analyzing a set of natural language text describing a future engagement and by analyzing, using a convolutional neural network, a set of image data describing the future engagement, a set of characteristics of the future engagement, the future engagement comprising a project expected to commence in the future;
  determining, by using a clustering technique on a plurality of data points, that the first engagement is above a threshold similarity with the future engagement, wherein a data point in the plurality of data points corresponds to a set of characteristics of an engagement in a plurality of engagements, the plurality of engagements including the first engagement and the future engagement;
  forecasting, using the skillset used in performing the first engagement, a required skillset of the future engagement;
  generating, by executing the natural language processing model analyzing a set of natural language text describing a current skillset, a set of characteristics of the current skillset; and
  generating, using the required skillset of the future engagement and the set of characteristics of the current skillset, a learning path, the learning path describing a set of steps required to transform the current skillset to the required skillset.

9. The computer program product of claim 8, wherein the first engagement comprises a completed engagement.

10. The computer program product of claim 8, wherein the first engagement comprises an ongoing engagement.

11. The computer program product of claim 8, wherein the set of characteristics of the first engagement comprises a skillset used in performing the first engagement.

12. The computer program product of claim 8, wherein the set of characteristics of the first engagement comprises a level of skill of a skillset used in performing the first engagement.

13. The computer program product of claim 8, further comprising:
  augmenting, by executing a convolutional neural network model on a set of image data describing the first engagement, the set of characteristics of the first engagement.

14. The computer program product of claim 8, wherein the software application interfaces with an engagement management system to extrapolate a second future engagement from a cyclical engagement pattern.

15. The computer program product of claim 8, wherein the stored program instructions are stored in the at least one of the one or more storage media of a local data processing system, and wherein the stored program instructions are transferred over a network from a remote data processing system.

16. The computer program product of claim 8, wherein the stored program instructions are stored in the at least one of the one or more storage media of a server data processing system, and wherein the stored program instructions are downloaded over a network to a remote data processing system for use in a computer readable storage device associated with the remote data processing system.

17. The computer program product of claim 8, wherein the computer program product is provided as a service in a cloud environment.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
  program instructions to construct a software application interfacing with a training management system, the software application comprising a forecasting function enhancing a training selection functionality of the training management system by:
  generating, by executing a natural language processing model analyzing a set of natural language text describing a first engagement, a set of characteristics of the first engagement, the set of characteristics of the first engagement comprising a skillset associated with performing the first engagement;
  generating, by executing the natural language processing model analyzing a set of natural language text describing a future engagement and by analyzing, using a convolutional neural network, a set of image data describing the future engagement, a set of characteristics of the future engagement, the future engagement comprising a project expected to commence in the future;
  determining, by using a clustering technique on a plurality of data points, that the first engagement is above a threshold similarity with the future engagement, wherein a data point in the plurality of data points corresponds to a set of characteristics of an engagement in a plurality of engagements, the plurality of engagements including the first engagement and the future engagement;
  forecasting, using the skillset used in performing the first engagement, a required skillset of the future engagement;
  generating, by executing the natural language processing model on a set of natural language text describing a current skillset, a set of characteristics of the current skillset; and
  generating, using the required skillset of the future engagement and the set of characteristics of the current skillset, a learning path, the learning path describing a set of steps required to transform the current skillset to the required skillset.

19. The computer system of claim 18, wherein the first engagement comprises a completed engagement.

20. The computer system of claim 18, wherein the software application interfaces with an engagement management system to extrapolate a second future engagement from a cyclical engagement pattern.

* * * * *